United States Patent [19]

Weiner

[11] 4,205,572
[45] Jun. 3, 1980

[54] SAW BLADE RETAINER AND KICKBACK CLUTCH ASSEMBLY

[76] Inventor: Robert I. Weiner, 305 W. Chesapeake Ave., Towson, Md. 21204

[21] Appl. No.: 937,723

[22] Filed: Aug. 29, 1978

[51] Int. Cl.² ............................................. B27B 5/32
[52] U.S. Cl. ......................................... 83/666; 85/62; 151/37; 30/388
[58] Field of Search ............... 83/666; 30/388; 85/62; 151/37

[56] References Cited

U.S. PATENT DOCUMENTS

| | | | |
|---|---|---|---|
| 3,153,974 | 10/1964 | Canning | 85/62 |
| 3,266,535 | 8/1966 | Brodie | 83/666 |
| 3,687,184 | 8/1972 | Wagner | 151/37 |
| 3,978,761 | 9/1976 | Sosinski | 151/37 |
| 4,020,734 | 5/1977 | Bell | 85/62 |

*Primary Examiner*—Donald R. Schran
*Attorney, Agent, or Firm*—Colton & Stone, Inc.

[57] ABSTRACT

In a circular power saw blade mounting arrangement of the kickback clutch type, the blade clamping washer, spring washer and blade screw are retained as a permanent subassembly to eliminate the possibility of substituting an incorrect part. Markings on the exposed face of the clamping washer and the spring washer provide visual indication as to whether the spring washer is properly tensioned.

6 Claims, 7 Drawing Figures

SAW BLADE RETAINER AND KICKBACK CLUTCH ASSEMBLY

BACKGROUND OF THE INVENTION

On circular power saws it is a common practice to provide a kickback clutch to prevent the saw from kicking out of the work if the blade jams and stops. In blade mountings of this type, the blade is not keyed to the drive shaft but rather is clamped between a shoulder on the drive shaft and a washer, the clamping force being provided by a spring washer retained by a screw threaded axially into the end of the drive shaft. The arrangement functions as a torque-limiting clutch so that, upon jamming of the blade in the work, the driving torque will not cause the saw to kick out of the work. When properly assembled and adjusted, such a clutch is an effective safety feature. If, however, the mounting screw is tightened excessively or if the spring washer is replaced by a different washer, the effectiveness of the clutch may be defeated. Brodie, U.S. Pat. No. 3,266,535, provides a solution for the problem of overtightening by the use of a set screw serving as a stop to limit the depth to which the blade screw may be threaded into the spindle bore. It is possible with the arrangement of the Brodie patent, however, for the user to inadvertently replace the spring washer with a different washer thereby defeating the safety feature of the arrangement. It is also possible in this arrangement to substitute a shorter screw for the blade screw, again rendering the safety feature ineffective.

Among the objects of the present invention are the provision of a saw blade mounting assembly of the kickback clutch type in which the substitution of an incorrect component which would defeat the intended purpose of the assembly is precluded; the provision of a saw blade mounting assembly in which that portion of the assembly which is removed from the saw when a blade is being changed is a permanent subassembly, thereby eliminating the risk of loss of the individual components thereof; and the provision of a kickback clutch saw blade mounting incorporating visual means for indicating when the clutch is properly tensioned.

BRIEF DESCRIPTION OF THE INVENTION

The above and other objects of the invention which will become apparent hereinafter are achieved by the provision of a circular saw blade mounting assembly of the kickback or torque limiting type comprising a blade screw threaded into the driven output shaft of the saw, a spring washer carried by the blade screw, a clamping washer between the spring washer and the saw blade, and a retainer cup holding the screw, spring washer and clamping washer in assembled relationship to one another. A circular marking on the outer face of the clamping washer furnishes a visual indication of whether the spring washer is properly tensioned.

For a more complete understanding of the invention and the objects and advantages thereof reference should be had to the following detailed description and the accompanying drawings wherein preferred embodiments of the invention are described and illustrated.

DETAILED DESCRIPTION OF THE PREFERRED EMBODIMENTS

Figure 1:
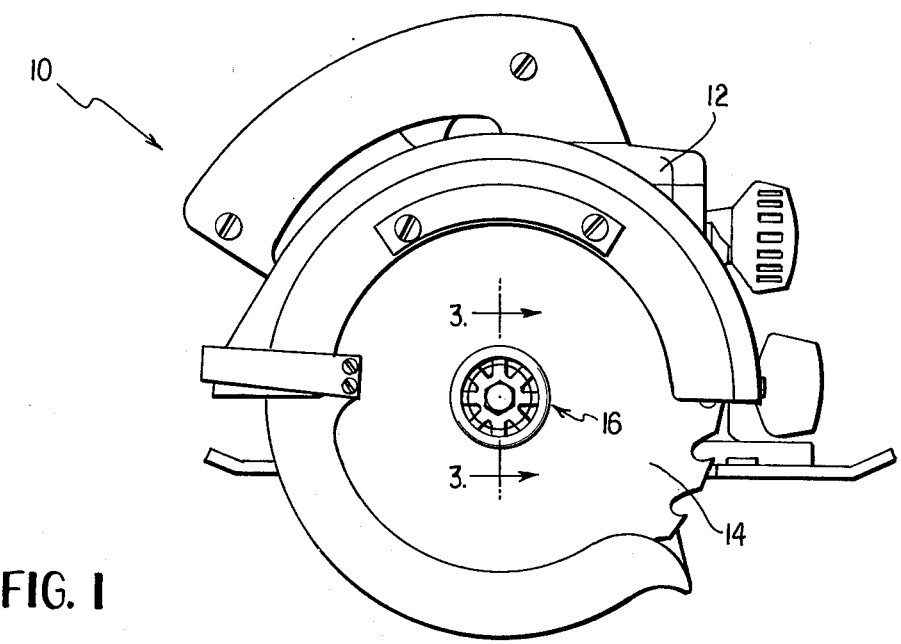
FIG. 1 is a side elevational view of a circular saw equipped with the blade retaining and kickback clutch assembly of the present invention.
Figure 2:
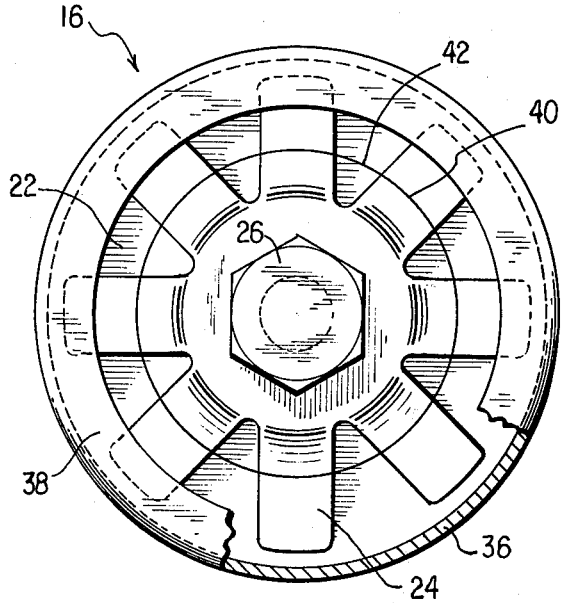
FIG. 2 is a fragmentary elevational view, on an enlarged scale relative to that of FIG. 1, of the blade retaining and kickback clutch assembly.
Figure 3:
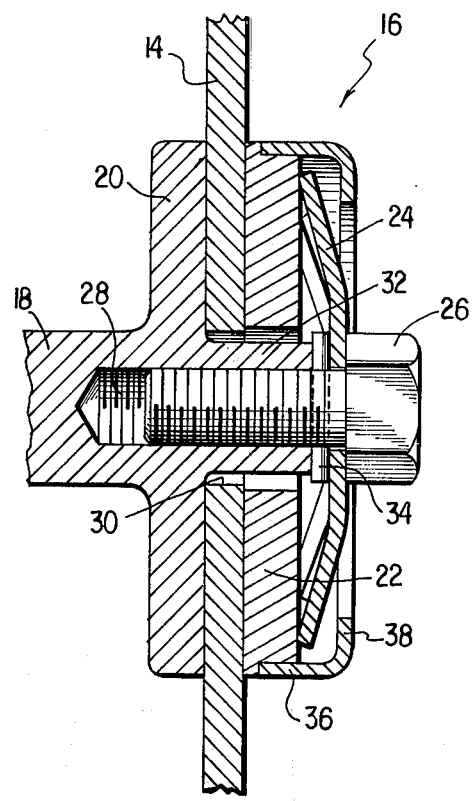
FIG. 3 is a fragmentary transverse sectional view taken on the line 3—3 of FIG. 1.

Referring first to FIGS. 1-3, there is shown a portable power saw 10 having a housing 12, a circular saw blade 14 and a blade retaining and slip clutch assembly 16. With the exception of the assembly 16, the saw is of conventional construction and includes an electric motor and gearing (not shown) for rotatably driving a spindle 18. As will be seen in FIG. 3, the saw blade 14 is clamped between a shoulder 20 of the spindle 18 and an annular washer 22, the clamping force being provided by a spring washer 24 bearing against the outer face of the annular washer 22 and against the head of a screw 26 threaded into the tapped bore 28 of the spindle 18. The central aperture 30 of the saw blade 14 is of greater diameter than is the end portion 32 of the spindle so that driving torque is transmitted to the blade soley by means of the frictional engagement between the blade 14 and the abutting surfaces of the spindle shoulder 20 and washer 22. The arrangement constitutes a torque limiting clutch with the maximum torque transmitted to the blade 18 being determined by the clamping force supplied by the spring washer 24.

Figure 5:
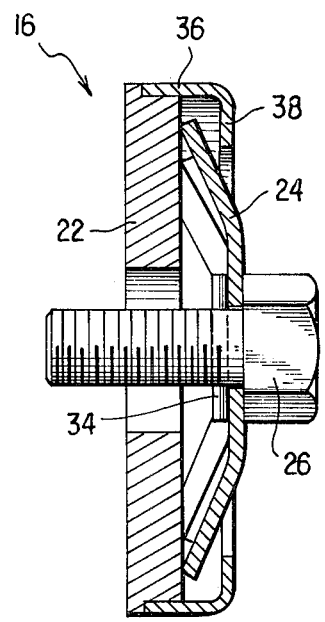
FIG. 5 is a transverse sectional view of the blade retaining and kickback clutch assembly detached from the saw.

It will be readily apparent that the effectiveness of the assembly 16 will be defeated if the spring washer 24 is replaced by a different type or size washer. In order to prevent the substitution of an improper part, the spring washer 24 is held captive on the blade screw 26 by means of a retainer pin 34 passing diametrically through the shank of the screw. The annular washer 22 is retained by means of an annular ring 36 press fitted to the periphery of the washer 22 and having a radially inwardly directed flange 38 overlying the ends of the spring washer 24. As will be seen in FIG. 5, the entire blade retaining and slip clutch assembly 16 is removable as a unitary assembly with the result that the loss of an incorrect component is eliminated.

Figure 4:
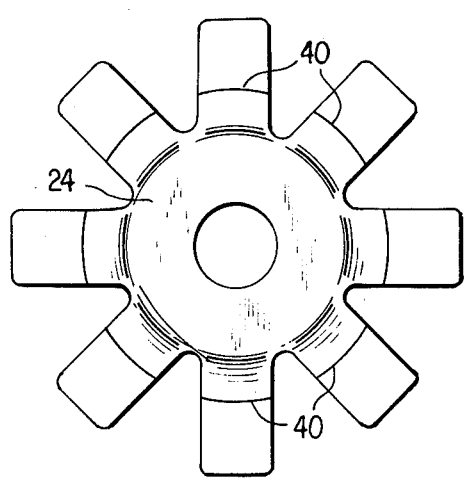
FIG. 4 is an elevational view of a component of the blade retaining and kickback clutch assembly.
Figure 6:
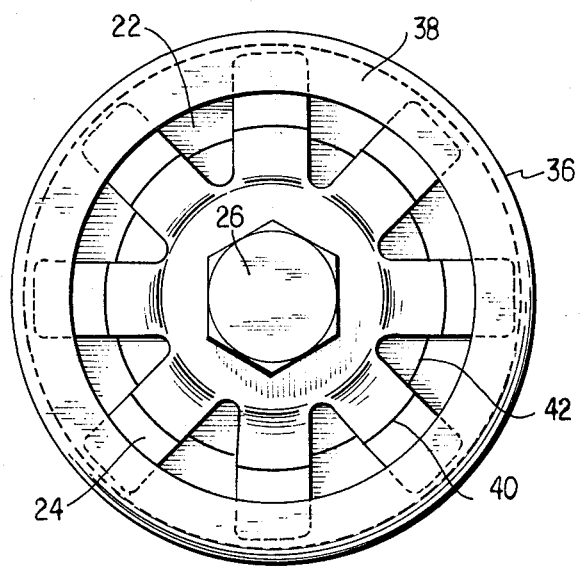
FIG. 6 is an elevational view similar to that of FIG. 2 but showing the clutch improperly tightened.

The effectiveness of the slip clutch assembly 16 can also be defeated by excessive tightening of the blade screw 26 which, by increasing the clamping force exerted by the spring washer 24, raises the torque limit of the slip clutch to a point beyond that at which kickback will occur if the blade jams. In order to prevent accidental overtightening of the blade screw, a tension indicating arrangement is provided. As will be seen in FIG. 4, the outer face of the spring washer 24 is inscribed or otherwise marked with arcuate lines 40 lying on a circle concentric with the center of the washer. The outer face of the washer 22 is likewise marked with a circle 42 concentric about the center of the washer. The radii of the two circles are such that the markings 40 on the face of the spring washer 24 are visually aligned with the circular marking 42 on the face of the washer 22 when the blade screw 26 is properly tightened. Overtightening of the blade screw, by overcompressing the spring washer 24, results in the arcuate markings 40 being positioned radially outwardly of the circular marking 42, as shown in FIG. 6. Similarly, if the blade screw is insufficiently tightened, the markings 40 are radially inwardly positioned with respect to the circular marking 42.

Figure 7:
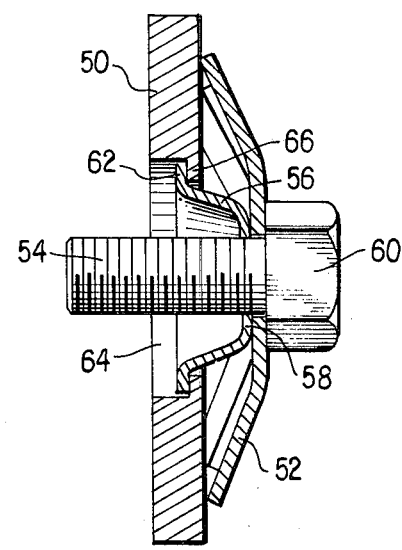
FIG. 7 is a side elevational view, partially in section, of a modified form of the invention.

A second embodiment of the kickback clutch assembly of the present invention is illustrated in FIGS. 7–9. In this embodiment, the annular blade clamping washer 50, spring washer 52 and blade screw 54 are retained as an assembly by means of a retainer cup 56 having a central hub 58 received on the shank of the blade screw 54. The spring washer 52 is held captive between the head 60 of the blade screw and the hub 58. The retainer cup 52 is permanently attached to the blade screw 54, for example, by projection welding. The side walls of the retainer cup diverge outwardly, and terminate in a radially outwardly projecting annular flange 62. The central opening 64 of the annular washer 50 has, adjacent the outer face of the washer, a radially inwardly directed flange 66 which overlies the retainer cup flange 62. As with the previously described embodiment, the outer face of the spring washer 52 may be provided with arcuate markings and the outer face of the annular washer 50 provided with a circular marking to furnish a visual indicator of the tension applied by the spring washer. Alternately, the face of the annular washer may be marked with a circle of such radius that the tips of the spring washer 52 meet this circle when the desired tension is achieved.

It will be understood that while preferred embodiments of the invention have been illustrated and described, the invention is not limited to the described embodiments. Reference should be had to the appended claims in determining the true scope of the invention.

What is claimed is:

1. In a circular power saw having a driven output shaft including an annular flange and an axially extending threaded bore and a circular saw blade rotatable on said shaft, a kickback clutch type blade mounting assembly comprising:

an annular washer adapted to be received on said output shaft immediately adjacent said blade whereby said blade is positioned between said flange and said washer;

a spring washer;

a blade screw passing through said spring washer and adapted to be threaded into said bore for tensioning said spring washer against said annular washer; and means for retaining said annular washer, said spring washer and said blade screw as an inseparable assembly.

2. The blade mounting assembly of claim 1 wherein said means for retaining comprises a first retainer secured to the shank of said blade screw captivating said spring washer between the head of said screw and said first retainer and a second retainer comprising a ring-like member secured to the circumferential periphery of said annular washer and having a radially inwardly extending annular flange overlying the radially outer portion of said spring washer.

3. The blade mounting assembly of claim 1 wherein said means for retaining comprises a retainer cup secured to the shank of said blade screw captivating said spring washer between the head of said blade screw and said retainer cup, said retainer cup having a radially outwardly extending annular flange and said annular washer having, at the central opening thereof, a radially inwardly extending flange overlying the radially outer portion of said retainer cup annular flange and interposed between said last mentioned flange and said spring washer.

4. The blade mounting assembly of claim 1 wherein the face of said annular washer contacted by said spring washer is provided with means for visually indicating the tension applied by said spring washer.

5. The blade mounting assembly of claim 4 wherein said means for visually indicating comprises a circular marking on said face, the radius of said circular marking being such that the radially outer edge of said spring washer is aligned with said marking when said spring is properly tensioned.

6. The blade mounting assembly of claim 4 wherein said spring washer is of star configuration having a plurality of radially extending arms and wherein said means for visually indicating comprises a circular marking on said face of said annular washer and an arcuate marking on each of said arms of said spring washer, the radii of said circular marking and said arcuate markings being such that said arcuate markings are coincident with said circular marking when said spring washer is properly tensioned.

* * * * *